United States Patent Office 3,321,483
Patented May 23, 1967

3,321,483
SUBSTITUTED 3,4 - DIHYDRO - 3 - PHENYL - 4 - HYDROXY - {[(AMINO)ALKOXY (OR ALKYLTHIO) PHENYL]}THIOCHROMAN
Ronnie R. Crenshaw, De Witt, N.Y., assignor to Bristol-Myers Company, New York, N.Y., a corporation of Delaware
No Drawing. Filed June 9, 1966, Ser. No. 556,261
13 Claims. (Cl. 260—293.4)

This invention relates to novel compounds. More particularly, this invention relates to novel compounds which possess valuable utility as oral antifertility agents, and for controlling the animal population and to methods for the preparation thereof. In another aspect, this invention relates to intermediates useful in the preparation of the novel compounds. In still another aspect, this invention relates to a novel method of inhibiting pregnancy and to a novel method of controlling the animal population.

It is an object of this invention to provide a new class of chemical compounds. It is another object of the present invention to provide novel compounds having antifertility activity and methods for the preparation thereof. It is a further object of the present invention to provide a novel method of inhibiting pregnancy. It is still a further aspect of the present invention to provide a novel method of controlling the animal population.

These and other objects which may appear as the specification proceeds are achieved by this invention which comprises the provision of compounds selected from the group consisting of compounds having the following formula (I)

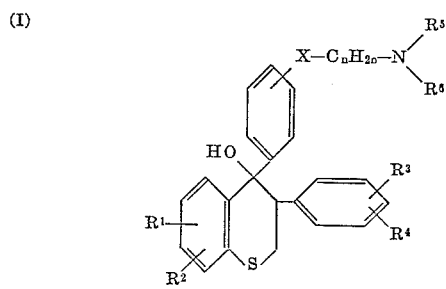

and the pharmaceutically acceptable nontoxic salts thereof. In Formula I, $n$ is a whole integer from 1 to 6 inclusive;

$R^1$, $R^2$, $R^3$ and $R^4$ each represent a member selected from the group consisting of hydrogen, chloro, bromo, iodo, fluoro, trifluoromethyl, (lower)alkyl, (lower)alkoxy, di(lower)alkylamino, di(lower)alkylsulfamyl, (lower)alkanoyl, phenyl, phenoxy, benzyl and cycloalkyl radicals having from 5 to 7 carbon atoms inclusive, e.g. cyclopentyl, cyclohexyl and cycloheptyl;

$R^5$ and $R^6$ each represent a member selected from the group consisting of (lower)alkyl, (lower)alkenyl, (lower)alkynyl, phenyl, phenyl(lower)alkyl, cycloalkyl radicals having from 3 to 7 carbon atoms inclusive, e.g. cyclopropyl, cyclobutyl, cyclopentyl, cyclohexyl and cycloheptyl, and when taken together with —N<, constitute a heterocyclic ring selected from the group consisting of pyrrolidino, (lower)alkylpyrrolidino, di(lower)alkylpyrrolidino, piperidino, (lower)alkylpiperidino, di(lower)alkylpiperidino, morpholino, (lower)alkylmorpholino, di(lower)alkylmorpholino, tetrahydropyridino, e.g. 1,2,5,6 - tetrahydropyridino, (lower)alkyltetrahydropyridino, di(lower)alkyltetrahydropyridino, N'-(lower)alkylpiperazino, N'-(lower)alkyl-(lower)alkylpiperazino, N'-(lower)alkyl - di(lower)alkylpiperazino, hexamethyleneimino, (lower)alkylhexamethyleneimino, di(lower)alkylhexamethyleneimino;

X is a member selected from the group consisting of oxygen and sulfur.

The pharmaceutically acceptable nontoxic salts include the organic and inorganic acid addition salts, e.g., those prepared from acids such as hydrochloric, sulfuric, sulfamic, tartaric, fumaric, hydrobromic, hydriodic, glycolic, citric, maleic, phosphoric, succinic, acetic, nitric and the like.

The term "(lower)alkyl" as used herein means both straight and branched chain alkyl radicals containing from 1 to 8 carbon atoms, e.g. methyl, ethyl, propyl, isopropyl, butyl, isobutyl, t-butyl, amyl, hexyl, 2-ethylhexyl, etc.

The term "(lower)alkenyl" as used herein means both straight and branched chain alkenyl radicals containing from 2 to 8 carbon atoms, e.g. ethenyl, allyl, 1-propenyl, 1-butenyl, 3-butenyl, 2-methyl-1-propenyl, 3-pentenyl, 1-hexenyl, 7-octenyl, etc.

The term "(lower)alkynyl" as used herein means both straight and branched chain alkynyl radicals containing from 2 to 8 carbon atoms, e.g. ethinyl, propargyl, 1-butinyl, 2-butinyl, 1,1-dimethylpropargyl, 1-pentinyl, 1-heptinyl, etc.

Similarly, where the term "(lower)" is used as part of the description of another group, e.g., (lower)alkoxy, it refers to the alkyl portion of such group which is therefore as described in connection with (lower)alkyl.

Preferred compounds of the present invention are those having the following formulae (II)

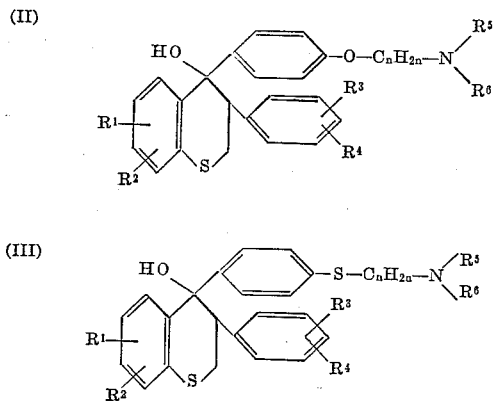

(III)

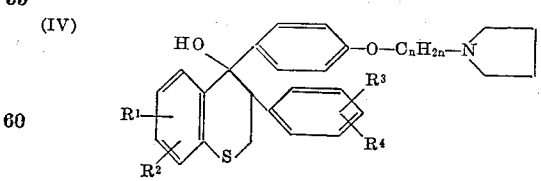

wherein $n$, $R^1$, $R^2$, $R^3$, $R^4$, $R^5$ and $R^6$ are as represented above.

Still more preferred compounds of the present invention are those having the following formulae (IV)

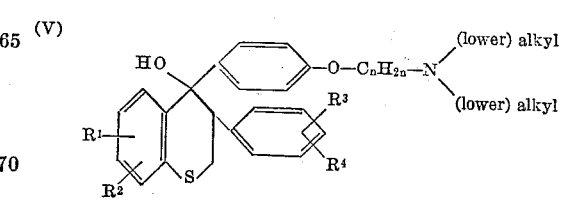

(V)

(VI)

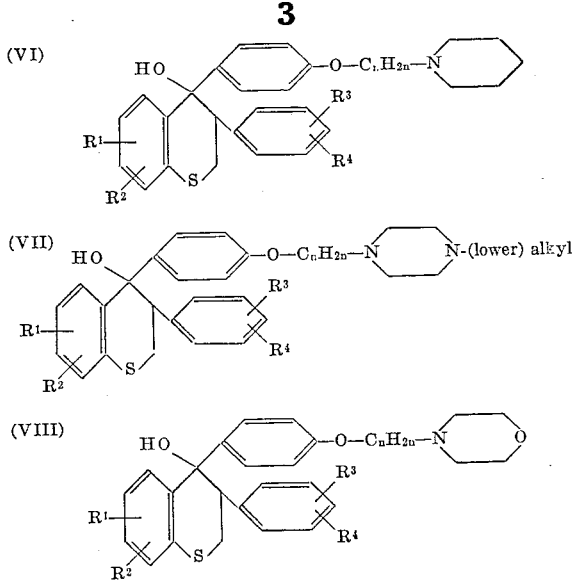

(VII)

(VIII)

wherein $n$, $R^1$, $R^2$, $R^3$ and $R^4$ are as represented above.

The compounds of this invention are valuable pharmaceutical agents. They possess antifertility activity and are orally active antifertility agents in mammals. The compounds of this invention are also useful in controlling the animal population, for example, mice.

The antifertility tests of the compounds of the present invention were carried out on mice. The compounds were administered orally to adult female mice for six days. A single dose was administered three days before mating and single doses were administered daily for five days during mating. The mice were sacrificed on the eleventh day following mating and their uteri examined for implantation sites. The absence of implantation sites in the uteri indicated that pregnancy was completely inhibited. When, for example, the preferred compound of the present invention, 3,4-dihydro-7-methoxy-3-phenyl-4-hydroxy - 4 - p-[2-(1 - pyrrolidyl)ethoxy]phenyl-2H-1-benzothiopyran hydrochloride, was administered orally at doses as low as 10 mgm./kg./day, no implantation sites were observed in any of the mice tested; hence pregnancy was completely inhibited in each of the mice.

The compounds of the present invention are prepared as exemplified below by the following series of reactions.

A. A thiophenol of the formula (IX)

wherein $R^1$ and $R^2$ are as described above, is reacted with an α-phenylacrylic acid of the formula (X)

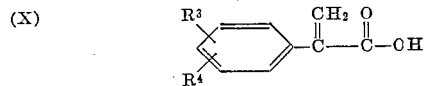

wherein $R^3$ and $R^4$ are as described above, preferably by heating at a temperature of about 125° C. for about 20 hours, to produced a phenylthiophenylpropionic acid of the formula (XI)

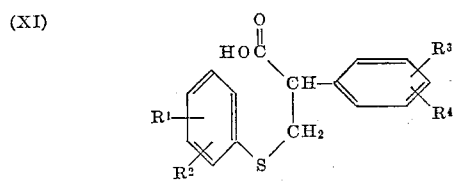

wherein $R^1$, $R^2$, $R^3$ and $R^4$ are as described above.

B. The phenylthiophenylpropionic acid prepared in Step A is cyclized by first reacting the compound with polyphosphoric acid preferably at a temperature of about 80–86° C. for about one hour to produce a 3-phenyl-4-thiocromanone of the formula (XII)

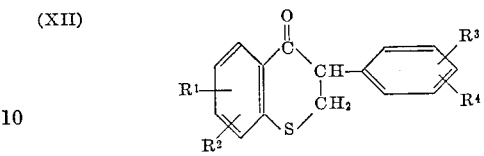

wherein $R^1$, $R^2$, $R^3$ and $R^4$ are as described above.

C. The compounds of the present invention are prepared by the reaction of the 3-phenyl-4-thiochromanone prepared in Step B with a Grignard reagent of the formula (XIII)

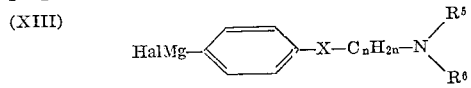

wherein Hal is chloro, bromo or iodo, and $n$, X, $R^5$ and $R^6$ are as described above. The reaction is preferably carried out in the presence of an inert solvent, e.g., tetrahydrofuran, and at the boiling point of the reaction mixture. The compounds thus formed correspond to Formula I.

Alternatively, the compounds of the present invention may be prepared by the reaction of the 3-phenyl-4-thiochromanone with an organo-lithium compound of the formula (XIV)

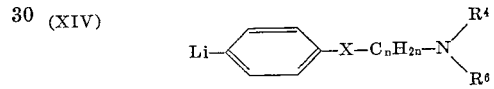

wherein $n$, X, $R^5$ and $R^6$ are as represented above.

The starting materials used in the processes described herein are compounds which are either commercially available, well-known in the art, or easily prepared in accordance with standard organic procedures previously described in the chemical literature.

For example, α-phenylacrylic acid is a known compound having the name atropic acid (cf. The Merck Index, Seventh Edition, p. 111). The known procedures for preparing atropic acid may be used to prepare other α-phenylacrylic acids of Formula X, e.g., as summarized on pages 414 and 470 of volume III, The Chemistry of Carbon Compounds by Victor von Richter, edited by Richard Anschutz, translated from the twelfth German edition, Elseiver Publishing Company, Inc., New York, N.Y. (1947); and McKenzie, J. Chem. Soc., 115, 834 (1919).

The thiophenols of Formula IX may be prepared by a variety of procedures well known in the art. For example, they may be prepared by reduction of the corresponding sulfonyl chlorides; from treatment of the corresponding phenyl magnesium halides (Grignard reagents) or phenyl lithium compounds, with elemental sulfur; or from the conversion of corresponding phenyl amines to diazonium salts and subsequent treatment with potassium ethyl xanthate, sodium hydrosulfide, or the like, followed by hydrolysis. A method for the preparation of the thiophenols is described by G. Perold and P. van Lingen, Chem. Ber., 92, 296 (1959).

The Grignard reagents having the Formula XIII used in Step C are prepared by procedures well-known in the art. The reagents are prepared by the reaction of magnesium with a halobenzene of the formula (XV)

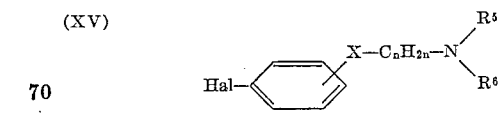

wherein Hal, X, $n$, $R^5$ and $R^6$ are as described above, in the presence of an inert solvent, e.g., tetrahydrofuran. The halo-benzenes of Formula XV used in the preparation of the Grignard reagents are prepared by well-known procedures, e.g., cf. A. Burger, E. L. Wilson, C. O. Brindley and F. Bernheim, J. Am. Chem. Soc., 67, 1416–1419 (1945); and South African Patent No. 62/3,277, which describe the reaction of a halo-phenol (a halo-thiophenol can be used) with a tertiary aminoalkyl halide of the formula (XVI) 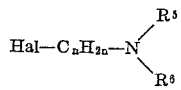

wherein Hal, $n$, $R^5$ and $R^6$ are as described above, in an inert solvent, e.g., methanol, ethanol, and in the presence of a base such as sodium hydroxide. The tertiary aminoalkyl halides of Formula XVI are prepared by the halogenation of a tertiary aminoalkanol as described by Burger et al. Such tertiary aminoalkanols may be prepared by the condensation reaction of a secondary amine of the formula (VII) 

wherein $R^5$ and $R^6$ are as described above, and a halo alkanol of the formula (XVIII)      Hal—$C_nH_{2n}$—OH wherein Hal and $n$ are as described above, as described by R. B. Moffett, J. Org. Chem., 14, 862 (1949). The tertiary aminoalkanols can also be prepared by heating a secondary amine of Formula XVII with a halo alkanoic acid ester and then reducing the aminoalkanoic acid ester thus formed with a reducing agent such as lithium aluminum hydride, as described by Moffett. The preparation of each of the foregoing intermediates used in the preparation of the Grignard reagents is well-known in the art.

The compounds of this invention may be administered as the free bases or in the form of their nontoxic addition salts. They may be compounded and formulated into pharmaceutical preparations in unit dosage form for oral administration with organic or inorganic solid materials or liquids which are pharmaceutically acceptable carriers. The compositions may take the form of tablets, powders, granules, capsules, suspensions, solutions and the like. Such compositions are considered within the scope of this invention.

The compositions of this invention when administered orally, in an effective amount, are effective in the inhibition of pregnancy. The usual daily dosage is from about 10 to 200 mgm./kg.

The following examples are intended to illustrate the invention described herein without unduly restricting it.

EXAMPLE 1

*Preparation of atropic acid*

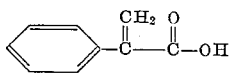

A solution of tropic acid (35.0 g.) in water (350 ml.) containing potassium hydroxide (105 g.) was refluxed for three hours.

The solution was acidified at 0° C. with 10% sulfuric acid to yield atropic acid; recrystallization (water) gave white needles, M.P. 103–105° C.

Atropic acid is reported by McKenzie and Wood, J. Chem. Soc., 115, 834 (1919).

EXAMPLE 2

*Preparation of 3-(m-methoxyphenylthio)-2-phenylpropionic acid*

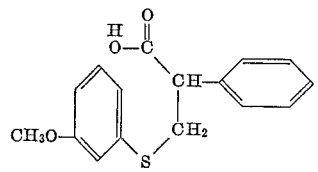

A mixture of atropic acid (10.45 g.) and m-methoxythiophenol (G. Perold and P. van Lingen, Chem. Ber., 92, 296 (1959) (9.88 g.) was heated under a nitrogen atmosphere at 125° C. for 20 hours.

The mixture was dissolved in ether and the resultant solution was washed with aqueous 0.1 N iodine-potassium iodide solution and then was extracted with aqueous sodium hydroxide solution. Acidification of the basic extracts gave an oil which was extracted into ether. Washing, drying and subsequent evaporation of the ether gave 3-(m-methoxyphenylthio)-2-phenylpropionic acid (15.59 g.) as an oil.

EXAMPLE 3

*Preparation of 7-methoxy-3-phenyl-4-thiochromanone*

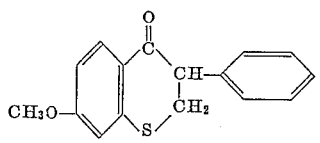

A mixture of 3-(m-methoxyphenylthio)-2-phenylpropionic acid (39.9 g.) and polyphosphoric acid (798 g.) was heated at 80–86° C. for 1 hour. The mixture was poured onto ice and then was extracted with chloroform. The chloroform extracts were washed with aqueous sodium bicarbonate and then with water. Drying (sodium sulfate) and removal of the solvent gave the product as an oil; recrystalliaztion from ethyl acetate-petroleum ether gave 7-methoxy-3-phenyl-4-thiochromanone, M.P. 151–152.5° C.

*Analysis.*—Calcd. for $C_{16}H_{14}O_2S$: C, 71.08; H, 5.22; S, 11.86. Found: C, 71.13; H, 5.37; S, 10.99.

EXAMPLE 4

*Preparation of 1-[2-(p-bromophenoxy)ethyl]pyrrolidine*

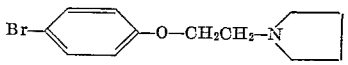

N-(2-chloroethyl)pyrrolidine hydrochloride (31.6 gm.) was added to a solution of sodium methoxide (9.2 gm.) in absolute ethanol (75 ml.). After stirring for 15 minutes at 25° C., sodium chloride was separated by filtration. The filtrate was added slowly over a period of 30 minutes to a hot solution of p-bromophenol (40.9 gm.) in absolute ethanol (225 ml.) containing sodium methoxide (12.7 gm.).

After heating under reflux for three hours, the mixture was cooled, the precipitated salt was separated, and the solvent was removed under reduced pressure. The residual oil was dissolved in ether which was washed in succession with 10% aqueous sodium hydroxide solution, water and saturated brine solution. Removal of the ether and distillation of the residue gave 26.0 gm. of 1-[2-(p-bromophenoxy)ethyl]pyrrolidine, B.P. 138–140° C./1.2 mm.

*Analysis.*—Calcd. for $C_{12}H_{16}BrNO$: NE, 270. Found: NE, 271.

EXAMPLE 5

*Preparation of 1-[2-(p-bromophenylthio)ethyl]pyrrolidine*

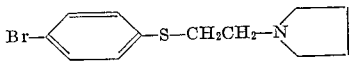

N-(2-chloroethyl)pyrrolidine hydrochloride (23.8 g.) was added to a solution of sodium methoxide (6.9 g.) in absolute ethanol (55 ml.). After stirring for 15 minutes at 25° C., the sodium chloride was separated, and the resultant clear solution was added dropwise over a period of one hour to a solution under reflux of p-bromothiophenol (33.6 g.) in absolute ethanol (170 ml.) containing sodium methoxide (9.6 g.).

After heating under reflux for 3 hours, the mixture was cooled, the precipitated salt was separated and the solvent was removed under reduced pressure. The residual oil was dissolved in ether, and the solution was extracted in succession with 10% aqueous sodium hydroxide solution, water and saturated brine solution. After removal of the solvent, distillation gave 22.3 g. of 1-[2-(p-bromophenylthio)ethyl]pyrrolidine, B.P. 158° C./1.1 mm.

*Analysis.*—Calcd. for $C_{12}H_{16}BrNS$: C, 50.35; H, 5.64; Br, 27.92; N, 4.89. Found: C, 50.80; H, 5.62; Br, 28.40; N, 4.90.

EXAMPLE 6

*Preparation of 3,4 - dihydro - 7 - methoxy - 3 - phenyl-4 - hydroxy -4 - {p - [2 - (1 - pyrrolidyl) - ethoxy]phenyl}2H - 1 - benzothiopyran hydrochloride*

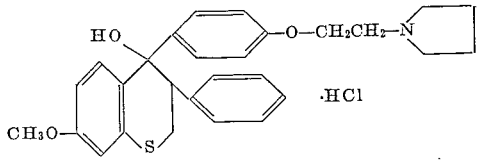

A mixture of 1-[2-(p-bromophenoxy)ethyl]pyrrolidine (9.35 g.), magnesium turnings (0.84 g.) and tetrahydrofuran (100 ml.) was heated under reflux until all of the magnesium had been consumed.

A solution of 7-methoxy-3-phenyl-4-thiochromanone (9.35 g.) in tetrahydrofuran (100 ml.) was added and the resultant solution was heated at reflux for 16 hours.

The mixture was cooled, ether added, and then water (3.4 ml.) was added dropwise while cooling in ice. The precipitated magnesium salts were separated by filtration. The filtrate was diluted with additional ether and then washed several times with water, dried and evaporated.

The residual oil (3,4-dihydro-7-methoxy-3-phenyl-4-hydroxy-4-{p-[2 - (1-pyrrolidyl)ethoxy]phenyl} - 2H-1-benzothiopyran), was taken up in ether which then was extracted several times with aqueous 0.5 N hydrochloric acid. The combined acid extracts were extracted with methylene chloride. Drying and evaporation of the methylene chloride gave a gum which was rubbed under acetone to give the product as a crystalline solid (2.11 g.). Recrystallization from methanol-ether gave 3,4-dihydro-7-methoxy-3-phenyl-4-hydroxy - 4-{p-[2 - (1-pyrrolidyl)ethoxy]phenyl} - 2H-1 - benzothiopyran hydrochloride, M.P. 172–173° C. with decomposition.

*Analysis.*—Calcd. for $C_{28}H_{31}NO_3S \cdot HCl$: C, 67.52; H, 6.50; N, 2.81; S, 6.44. Found: C, 67.74; H, 6.57; N, 2.64; S, 6.40.

EXAMPLE 7

When, in the procedure of Example 2, m-methoxythiophenol chloride is replaced by an equal molar amount of thiophenol,
2-methoxythiophenol,
4-methoxythiophenol,
2,4-dimethoxythiophenol,
3,5-dimethoxythiophenol,
2,3-dimethoxythiophenol,
3,4-dimethoxythiophenol,
3-ethoxythiophenol,
3-propoxythiophenol,
3-chlorothiophenol,
3-methylthiophenol,
4-ethylthiophenol,
2,4-dimethylthiophenol,
2-propylthiophenol,
3-trifluoromethylthiophenol,
4-iodothiophenol,
2-bromothiophenol,
3-fluorothiophenol,
3,4-dichlorothiophenol,
3-phenylthiophenol,
4-benzylthiophenol,
2-phenoxythiophenol,
3-dimethylaminothiophenol,
4-dimethylsulfamylthiophenol,
3-acetylthiophenol,
3-methoxy-4-methylthiophenol,
3-cyclohexylthiophenol,
2-cyclopentylthiophenol,
4-cycloheptylthiophenol and
3-methoxy-4-trifluoromethylthiophenol, there are obtained, 3-phenylthio-2-phenylpropionic acid,
3-(2-methoxyphenylthio)-2-phenylpropionic acid,
3-(4-methoxyphenylthio)-2-phenylpropionic acid,
3-(2,4-dimethoxyphenylthio)-2-phenylpropionic acid,
3-(3,5-dimethoxyphenylthio)-2-phenylpropionic acid,
3-(2,3-dimethoxyphenylthio)-2-phenylpropionic acid,
3-(3,4-dimethoxyphenylthio)-2-phenylpropionic acid,
3-(3-ethoxyphenylthio)-2-phenylpropionic acid,
3-(3-propoxyphenylthio)-2-phenylpropionic acid,
3-(3-chlorophenylthio)-2-phenylpropionic acid,
3-(3-methylphenylthio)-2-phenylpropionic acid,
3-(4-ethylphenylthio)-2-phenylpropionic acid,
3-(2,4-dimethylphenylthio)-2-phenylpropionic acid,
3-(2-propylphenylthio)-2-phenylpropionic acid,
3-(3-trifluoromethylphenylthio)-2-phenylpropionic acid,
3-(4-iodophenylthio)-2-phenylpropionic acid,
3-(2-bromophenylthio)-2-phenylpropionic acid,
3-(3-fluorophenylthio)-2-phenylpropionic acid,
3-(3,4-dichlorophenylthio)-2-phenylpropionic acid,
3-(3-phenylphenylthio)-2-phenylpropionic acid,
3-(4-benzylphenylthio)-2-phenylpropionic acid,
3-(2-phenoxyphenylthio)-2-phenylpropionic acid,
3-(3-dimethylaminophenylthio)-2-phenylpropionic acid,
3-(4-dimethylsulfamyphenylthio)-2-phenylpropionic acid,
3-(3-acetylphenylthio)-2-phenylpropionic acid,
3-(3-methoxy-4-methylphenylthio)-2-phenylpropionic acid,
3-(3-cyclohexylphenylthio)-2-phenylpropionic acid,
3-(2-cyclopentylphenylthio)-2-phenylpropionic acid,
3-(4-cycloheptylphenylthio)-2-phenylpropionic acid and
3-(3-methoxy-4-trifluoromethylphenylthio)-2-phenylpropionic acid, respectively.

EXAMPLE 8

When, in the procedure of Example 2, atropic acid (α-phenylacrylic acid) is replaced by an equal molar amount of α-4-methylphenylacrylic acid,
α-4-trifluoromethylphenylacrylic acid,
α-2-chlorophenylacrylic acid,
α-3-bromophenylacrylic acid,
α-4-iodophenylacrylic acid,
α-3-fluorophenylacrylic acid,
α-2-ethylphenylacrylic acid,
α-2,4-dichlorophenylacrylic acid,
α-4-methoxyphenylacrylic acid,
α-3-ethoxyphenylacrylic acid,
α-2-propylphenylacrylic acid,
α-4-phenylphenylacrylic acid,
α-3-phenoxyphenylacrylic acid,
α-2-propoxyphenylacrylic acid, α-2-methyl-4-trifluoromethylphenylacrylic acid,
α-4-benzylphenylacrylic acid,
α-3-cyclohexylphenylacrylic acid,
α-2-cyclopentylphenylacrylic acid,
α-4-acetylphenylacrylic acid,
α-3-dimethylsulfamylphenylacrylic acid,
α-4-dimethylaminophenylacrylic acid,
α-3-diethylaminophenylacrylic acid,
α-4-fluorophenylacrylic acid,
α-4-chlorophenylacrylic acid,
α-2-diethylaminophenylacrylic acid,
α-3-cycloheptylphenylacrylic acid,
α-4-bromophenylacrylic acid,
α-3-propanoylphenylacrylic acid, there are obtained, 3-(m-methoxyphenylthio)-2-(4-methylphenyl)propionic acid,
3-(m-methoxyphenylthio)-2-(4-trifluoromethylphenyl)propionic acid,
3-(m-methoxyphenylthio)-2-(2-chlorophenyl)propionic acid,
3-(m-methoxyphenylthio)-2-(3-bromophenyl)propionic acid,
3-(m-methoxyphenylthio)-2-(4-iodophenyl)propionic acid,
3-(m-methoxyphenylthio)-2-(3-fluorophenyl)propionic acid,
3-(m-methoxyphenylthio)-2-(2-ethylphenyl)propionic acid,
3-(m-methoxyphenylthio)-2-(2,4-dichlorophenyl)propionic acid,
3-(m-methoxyphenylthio)-2-(4-methoxyphenyl)propionic acid,
3-(m-methoxyphenylthio)-2-(3-ethoxyphenyl)propionic acid,
3-(m-methoxyphenylthio)-2-(2-propylphenyl)propionic acid,
3-(m-methoxyphenylthio)-2-(4-phenylphenyl)propionic acid,
3-(m-methoxyphenylthio)-2-(3-phenoxyphenyl)propionic acid,
3-(m-methoxyphenylthio)-2-(2-propoxyphenyl)propionic acid,
3-(m-methoxyphenylthio)-2-(2-methyl-4-trifluoromethylphenyl)propionic acid,
3-(m-methoxyphenylthio)-2-(4-benzylphenyl)propionic acid,
3-(m-methoxyphenylthio)-2-(3-cyclohexylphenyl)propionic acid,
3-(m-methoxyphenylthio)-2-(2-cyclopentylphenyl)propionic acid,
3-(m-methoxyphenylthio)-2-(4-acetylphenyl)propionic acid,
3-(m-methoxyphenylthio)-2-(3-dimethylsulfamylphenyl)propionic acid,
3-(m-methoxyphenylthio)-2(4-dimethylaminophenyl)propionic acid,
3-(m-methoxyphenylthio)-2-(3-diethylaminophenyl)propionic acid,
3-(m-methoxyphenylthio)-2-(4-fluorophenyl)propionic acid,
3-(m-methoxyphenylthio)-2-(4-chlorophenyl)propionic acid,
3-(m-methoxyphenylthio)-2-(2-diethylaminophenyl)propionic acid,
3-(m-methoxyphenylthio)-2-(3-cycloheptylphenyl)propionic acid,
3-(m-methoxyphenylthio)-2-(4-bromophenyl)propionic acid and
3-(m-methoxyphenylthio)-2-(3-propanoylphenyl)propionic acid,
respectively.

EXAMPLE 9

When, in the procedure of Example 3, 3-(m-methoxyphenylthio)-2-phenylpropionic acid is replaced by an equal molar amount of each of the products of Example 7, there are obtained, 3-phenyl-4-thiochromanone,
8-methoxy-3-phenyl-4-thiochromanone,
6-methoxy-3-phenyl-4-thiochromanone,
6,8-dimethoxy-3-phenyl-4-thiochromanone,
5,7-dimethoxy-3-phenyl-4-thiochromanone,
7,8-dimethoxy-3-phenyl-4-thiochromanone,
6,7-dimethoxy-3-phenyl-4-thiochromanone,
7-ethoxy-3-phenyl-4-thiochromanone,
7-propoxy-3-phenyl-4-thiochromanone,
7-chloro-3-phenyl-4-thiochromanone,
7-methyl-3-phenyl-4-thiochromanone,
7-ethyl-3-phenyl-4-thiochromanone,
6,8-dimethyl-3-phenyl-4-thiochromanone,
8-propyl-3-phenyl-4-thiochromanone,
7-trifluoromethyl-3-phenyl-4-thiochromanone,
6-iodo-3-phenyl-4-thiochromanone,
8-bromo-3-phenyl-4-thiochromanone,
7-fluoro-3-phenyl-4-thiochromanone,
6,7-dichloro-3-phenyl-4-thiochromanone,
7-phenyl-3-phenyl-4-thiochromanone,
6-benzyl-3-phenyl-4-thiochromanone,
8-phenoxy-3-phenyl-4-thiochromanone,
7-dimethylamino-3-phenyl-4-thiochromanone,
6-dimethylsulfamyl-3-phenyl-4-thiochromanone,
7-acetyl-3-phenyl-4-thiochromanone,
6-methyl-7-methoxy-3-phenyl-4-thiochromanone,
7-cyclohexyl-3-phenyl-4-thiochromanone,
8-cyclopentyl-3-phenyl-4-thiochromanone,
6-cycloheptyl-3-phenyl-4-thiochromanone and
6-trifluoromethyl-7-methoxy-3-phenyl-4-thiochromanone,
respectively.

EXAMPLE 10

When, in the procedure of Example 3, 3-(m-methoxyphenylthio)-2-phenylpropionic acid is replaced by an equal molar amount of each of the products of Example 8, there are obtained, 7-methoxy-3-(4-methylphenyl)-4-thiochromanone,
7-methoxy-3-(4-trifluoromethylphenyl)-4-thiochromanone,
7-methoxy-3-(2-chlorophenyl)-4-thiochromanone,
7-methoxy-3-(3-bromophenyl)-4-thiochromanone,
7-methoxy-3-(4-iodophenyl)-4-thiochromanone,
7-methoxy-3-(3-fluorophenyl)-4-thiochromanone,
7-methoxy-3-(2-ethylphenyl)-4-thiochromanone,
7-methoxy-3-(2,4-dichlorophenyl)-4-thiochromanone,
7-methoxy-3-(4-methoxyphenyl)-4-thiochromanone,
7-methoxy-3-(3-ethoxyphenyl)-4-thiochromanone,
7-methoxy-3-(2-propylphenyl)-4-thiochromanone,
7-methoxy-3-(4-phenylphenyl)-4-thiochromanone,
7-methoxy-3-(3-phenoxyphenyl)-4-thiochromanone,
7-methoxy-3-(2-propoxyphenyl)-4-thiochromanone,
7-methoxy-3-(2-methyl-4-trifluoromethylphenyl)-4-thiochromanone,
7-methoxy-3-(4-benzylphenyl)-4-thiochromanone,
7-methoxy-3-(3-cyclohexylphenyl)-4-thiochromanone,
7-methoxy-3-(2-cyclopentylphenyl)-4-thiochromanone,
7-methoxy-3-(4-acetylphenyl)-4-thiochromanone,
7-methoxy-3-(3-dimethylsulfamylphenyl)-4-thiochromanone,
7-methoxy-3-(4-dimethylaminophenyl)-4-thiochromanone,
7-methoxy-3-(3-diethylaminophenyl)-4-thiochromanone,
7-methoxy-3-(4-fluorophenyl)-4-thiochromanone,
7-methoxy-3-(4-chlorophenyl)-4-thiochromanone,
7-methoxy-3-(2-diethylaminophenyl)-4-thiochromanone,
7-methoxy-3-(3-cycloheptylphenyl)-4-thiochromanone,
7-methoxy-3-(4-bromophenyl)-4-thiochromanone and
7-methoxy-3-(3-propanoylphenyl)-4-thiochromanone,
respectively.

EXAMPLE 11

When, in the procedure of Example 6, 7-methoxy-3-phenyl-4-thiochromanone is replaced by an equal molar amount of each of the products of Example 9, there are obtained, 3,4-dihydro-3-phenyl-4-hydroxy-4-{p-[2-(1-pyrrolidyl)-ethoxy]-phenyl}-2H-1-benzothiopyran,
3,4-dihydro-8-methoxy-3-phenyl-4-hydroxy-4-{p-[2-(1-pyrrolidyl)-ethoxy]phenyl}-2H-1-benzothiopyran,
3,4-dihydro-6-methoxy-3-phenyl-4-hydroxy-4-{p-[2-(1-pyrrolidyl)ethoxy]phenyl}-2H-1-benzothiopyran,
3,4-dihydro-6,8-dimethoxy-3-phenyl-4-hydroxy-4-{p-[2-(1-pyrrolidyl)ethoxy]phenyl}-2H-1-benzothiopyran,
3,4-dihydro-5,7-dimethoxy-3-phenyl-4-hydroxy-4{p-[2-(1-pyrrolidyl)ethoxy]phenyl}-2H-1-benzothiopyran,
3,4-dihydro-7,8-dimethoxy-3-phenyl-4-hydroxy-4-{p-[2-(1-pyrrolidyl)ethoxy]phenyl}-2H-2-benzothiopyran,
3,4-dihydro-6,7-dimethoxy-3-phenyl-4-hydroxy-4-{p-[2-(1-pyrrolidyl)ethoxy]phenyl}-2H-1-benzothiopyran,
3,4-dihydro-7-ethoxy-3-phenyl-4-hydroxy-4-{p-[2-(1-pyrrolidyl)-ethoxy]phenyl}-2H-1-benzothiopyran,
3,4-dihydro-7-propoxy-3-phenyl-4-hydroxy-4-{p-[2-(1-pyrrolidyl)-ethoxy]phenyl}-2H-1-benzothiopyran,
3,4-dihydro-7-chloro-3-phenyl-4-hydroxy-4-{p-[2-(1-pyrrolidyl)-ethoxy]phenyl}-2H-1-benzothiopyran,
3,4-dihydro-7-methyl-3-phenyl-4-hydroxy-4-{p-[2-(1-pyrrolidyl)-ethoxy]phenyl}-2H-1-benzothiopyran,
3,4-dihydro-6-ethyl-3-phenyl-4-hydroxy-4-{p-[2-(1-pyrrolidyl)-ethoxy]phenyl}-2H-1-benzothiopyran,
3,4-dihydro-6,8-dimethyl-3-phenyl-4-hydroxy-4-{p-[2-(1-pyrrolidyl)ethoxy]phenyl}-2H-1-benzothiopyran,
3,4-dihydro-8-propyl-3-phenyl-4-hydroxy-4-{p-[2-(1-pyrrolidyl)-ethoxy]phenyl}-2H-1-benzothiopyran,
3,4-dihydro-7-trifluoromethyl-3-phenyl-4-hydroxy-4-{p-[2-(1-pyrrolidyl)ethoxy]phenyl}-2H-1-benzothiopyran,
3,4-dihydro-6-iodo-3-phenyl-4-hydroxy-4-{p-[2-(1-pyrrolidyl)-ethoxy]phenyl}-2H-1-benzothiopyran,
3,4-dihydro-8-bromo-3-phenyl-4-hydroxy-4-{p-[2-(1-pyrrolidyl)-ethoxy]phenyl}-2H-1-benzothiopyran,
3,4-dihydro-7-fluoro-3-phenyl-4-hydroxy-4-{p-[2-(1-pyrrolidyl)-ethoxy]phenyl}-2H-1-benzothiopyran,
3,4-dihydro-6,7-dichloro-3-phenyl-4-hydroxy-4-{p-[2-(1-pyrrolidyl)-ethoxy]phenyl}-2H-1-benzothiopyran,
3,4-dihydro-7-phenyl-3-phenyl-4-hydroxy-4-{p-[2-(1-pyrrolidyl)-ethoxy]phenyl}-2H-1-benzothiopyran,
3,4-dihydro-6-benzyl-3-phenyl-4-hydroxy-4-{p-[2-(1-pyrrolidyl)-ethoxy]phenyl}-2H-1-benzothiopyran,
3,4-dihydro-8-phenoxy-3-phenyl-4-hydroxy-4-{p-[2-(1-pyrrolidyl)-ethoxy]phenyl}-2H-1-benzothiopyran,
3,4-dihydro-7-dimethylamino-3-phenyl-4-hydroxy-4-{p-[2-(1-pyrrolidyl)ethoxy]phenyl}-2H-1-benzothiopyran,
3,4-dihydro-6-dimethylsulfamyl-3-phenyl-4-hydroxy-4-{p-[2-(1-pyrrolidyl)ethoxy]phenyl}-2H-1-benzothiopyran,
3,4-dihydro-7-acetyl-3-phenyl-4-hydroxy-4-{p-[2-(1-pyrrolidyl)-ethoxy]phenyl}-2H-1-benzothiopyran,
3,4-dihydro-6-methyl-7-methoxy-3-phenyl-4-hydroxy-4-{p-[2-(1-pyrrolidyl)ethoxy]phenyl}-2H-1-benzothiopyran,
3,4-dihydro-6-methyl-7-methoxy-3-phenyl-4-hydroxy-4-{p-[2-(1-pyrrolidyl)ethoxy]phenyl}-2H-1-benzothiopyran,
3,4-dihydro-7-cyclohexyl-3-phenyl-4-hydroxy-4-{p-[2-(1-pyrrolidyl)ethoxy]phenyl}-2H-1-benzothiopyran,
3,4-dihydro-8-cyclopentyl-3-phenyl-4-hydroxy-4-{p-[2-(1-pyrrolidyl)ethoxy]phenyl}-2H-1-benzothiopyran,
3,4-dihydro-6-cycloheptyl-3-phenyl-4-hydroxy-4-{p-[2-(1-pyrrolidyl)ethoxy]phenyl}-2H-1-benzothiopyran and
3,4-dihydro-6-trifluoromethyl-7-methoxy-3-phenyl-4-hydroxy-4-{p-[2-(1-pyrrolidyl)ethoxy]phenyl}-2H-1-benzothiopyran, respectively.

EXAMPLE 12

When, in the procedure of Example 6, 7-methoxy-3-phenyl-4-isothiochromanone is replaced by an equal molar amount of each of the products of Example 10, there are obtained, 3,4-dihydro-7-methoxy-3-(4-methylphenyl)-4-hydroxy-4-{p-[2-(1-pyrrolidyl)ethoxy]phenyl}-2H-1-benzothiopyran,
3,4-dihydro-7-methoxy-3(4-trifluoromethylphenyl)-4-hydroxy-4-{p-[2-(1-pyrrolidyl)ethoxy]phenyl}-2H-1-benzothiopyran,
3,4-dihydro-7-methoxy-3-(2-chlorophenyl)-4-hydroxy-4-{p-[2-(1-pyrrolidyl)ethoxy]phenyl}-2H-1-benzothiopyran,
3,4-dihydro-7-methoxy-3-(3-bromophenyl)-4-hydroxy-4-{p-[2-(1-pyrrolidyl)ethoxy]phenyl}-2H-1-benzothiopyran,
3,4-dihydro-7-methoxy-3-(4-iodophenyl)-4-hydroxy-4-{p-[2-(1-pyrrolidyl)ethoxy]phenyl}-2H-1-benzothiopyran,
3,4-dihydro-7-methoxy-3-(3-fluorophenyl)-4-hydroxy-4-{p-[2-(1-pyrrolidyl)ethoxy]phenyl}-2H-1-benzothiopyran,
3,4-dihydro-7-methoxy-3-(2-ethylphenyl)-4-hydroxy-4-{p-[2-(1-pyrrolidyl)ethoxy]phenyl}-2H-1-benzothiopyran,
3,4-dihydro-7-methoxy-3-(2,4-dichlorophenyl)-4-hydroxy-4-{p-[2-(1-pyrrolidyl)ethoxy]phenyl}-2H-1-benzothiopyran,
3,4-dihydro-7-methoxy-3-(4-methoxyphenyl)-4-hydroxy-4-{p-[2-(1-pyrrolidyl)ethoxy]phenyl}-2H-1-benzothiopyran,
3,4-dihydro-7-methoxy-3-(3-ethoxyphenyl)-4-hydroxy-4-{p-[2-(1-pyrrolidyl)ethoxy]phenyl}-2H-1-benzothiopyran,
3,4-dihydro-7-methoxy-3-(2-propylphenyl)-4-hydroxy-4-{p-[2-(1-pyrrolidyl)ethoxy]phenyl}-2H-1-benzothiopyran,
3,4-dihydro-7-methoxy-3-(4-phenylphenyl)-4-hydroxy-4-{p-[2-(1-pyrrolidyl)ethoxy]phenyl}-2H-1-benzothiopyran,
3,4-dihydro-7-methoxy-3-(3-phenoxyphenyl)-4-hydroxy-4-{p-[2-(1-pyrrolidyl)ethoxy]phenyl}-2H-1-benzothiopyran,
3,4-dihydro-7-methoxy-3-(2-propoxyphenyl)-4-hydroxy-4-{p-[2-(1-pyrrolidyl)ethoxy]phenyl}-2H-1-benzothiopyran,
3,4-dihydro-7-methoxy-3-(2-methyl-4-trifluoromethylphenyl)-4-hydroxy-4-{p-[2-(1pyrrolidyl)ethoxy]phenyl}-2H-1-benzothiopyran,
3,4-dihydro-7-methoxy-3-(4-benzylphenyl)-4-hydroxy-4-{p-[2-(1-pyrrolidyl)ethoxy]phenyl}-2H-1-benzothiopyran,
3,4-dihydro-7-methoxy-3-(3-cyclohexylphenyl)-4-hydroxy-4-{p-[2-(1-pyrrolidyl)ethoxy]phenyl}-2H-1-benzothiopyran,
3,4-dihydro-7-methoxy-3-(2-cyclopentylphenyl)-4-hydroxy-4-{p-[2-(1-pyrrolidyl)ethoxy]phenyl}-2H-benzothiopyran,
3,4-dihydro-7-methoxy-3-(4-acetylphenyl)-4-hydroxy-4-{p-[2-(1-pyrrolidyl)ethoxy]phenyl}-2H-1-benzothiopyran,
3,4-dihydro-7-methoxy-3-(3-dimethylsulfamylphenyl)-4-hydroxy-4-{p-[2-(1-pyrrolidyl)ethoxy]phenyl}-2H-1-benzothiopyran,
3,4-dihydro-7-methoxy-3-(4-dimethylaminophenyl)-4-hydroxy-4-{p-[2-(1-pyrrolidyl)ethoxylphenyl}-2H-1-benzothiopyran,
3,4-dihydro-7-methoxy-3-(3-diethylaminophenyl)-4-hydroxy-4-{p-[2-(1-pyrrolidylethoxy]phenyl}-2H-1-benzothiopyran,
3,4-dihydro-7-methoxy-3-(4-fluorophenyl)-4-hydroxy-4-{p-[2-(1-pyrrolidyl)ethoxy]phenyl}-2H-1-benzothiopyran, 3,4-dihydro-7-methoxy-3-(4-chlorophenyl)-4-hydroxy-4-{p-[2-(1-pyrrolidyl)ethoxy]phenyl}-2H-1-benzothiopyran, 3,4-dihydro-7-methoxy-3-(2-diethylaminophenyl)-4-hydroxy-4-{p-[2-(1-pyrrolidyl)ethoxy]phenyl}-2H-1-benzothiopyran, 3,4-dihydro-7-methoxy-3-(3-cycloheptylphenyl)-4-hydroxy-4-{p-[2-(1-pyrrolidyl)ethoxy]phenyl}-2H-1-benzothiopyran, 3,4-dihydro-7-methoxy-3-(4-bromophenyl)-4-hydroxy-4-{p-[2-(1-pyrrolidyl)ethoxy]phenyl}-2H-benzothiopyran and 3,4-dihydro-7-methoxy-3-(3-propanoylphenyl)-4-hydroxy-4-{p-[2-(1-pyrrolidyl)ethoxy]phenyl}-2H-1-benzothiopyran, respectively.

EXAMPLE 13

When, in the procedure of Example 6, 1-[2-(p-bromophenoxy)ethyl]pyrrolidine is replaced by an equal molar amount of 1-[2-(p-bromophenylthio)ethyl]pyrrolidine,
1-[-2-(p-bromophenoxy)ethyl]piperidine,
1-[2-(p-bromophenylthio)ethyl]piperidine,
1-[2-(p-bromophenylthio)ethyl]pyrrolidine,
1-[p-bromophenoxy-methyl]pyrrolidine,
1-[2-(p-bromophenoxy)ethyl]-2-methylpyrrolidine,
1-[2-(p-bromophenoxy)ethyl]-2,4-dimethylpyrrolidine,
1-[2-(p-bromophenoxy)ethyl]-3-ethylpyrrolidine,
1-[2-(p-bromophenoxy)ethyl]-3-butylpyrrolidine,
1-[2-(p-bromophenoxy)ethyl]-2,4-dimethylpiperidine,
1-[2-(p-bromophenoxy)ethyl]-3-methylpiperidine,
1-[2-(p-bromophenoxy)ethyl]-4-propylpiperidine,
1-[2-(p-bromophenoxy)ethyl]-4-methylpiperidine,
4-[2-(p-bromophenoxy)ethyl]morpholine,
4-[2-(p-bromophenoxy)ethyl]-2-methylmorpholine,
4-[2-(p-bromophenoxy)ethyl]-3-ethylmorpholine,
4-[2-(p-bromophenoxy)ethyl]-2,6-dimethylmorpholine,
1-[2-(p-bromophenoxy)ethyl]-4-methyl-1,2,5,6-tetrahydropyridine,
1-[2-(p-bromophenoxy)ethyl]-4-methylpiperazine,
1-[2-(p-bromophenoxy)ethyl]-2,4-dimethylpiperazine,
1-[2-(p-bromophenoxy)ethyl]-2,4,6-trimethylpiperazine,
1-[2-(p-bromophenoxy)ethyl]hexamethyleneimine,
1-[2-(p-bromophenoxy)ethyl]-2-methylhexamethyleneimine,
1-[2-(p-bromophenoxy)ethyl]-2,4-dimethylhexamethyleneimine,
1-[2-(p-bromophenoxy)isopropyl]pyrrolidine,
1-[3-(p-bromophenoxy)propyl]pyrrolidine,
1-[4-(p-bromophenoxy)butyl]pyrrolidine,
4-[2-(p-bromophenylthio)ethyl]morpholine,
1-[2-(p-bromophenylthio)ethyl]-4-methylpiperazine,
1-[2-(p-bromophenylthio)ethyl]hexamethyleneimine,
p-(2-N,N-dibutylaminoethoxy)bromobenzene,
p-(2-N,N-dimethylaminoethoxy)bromobenzene,
p-(2-N,N-diallylaminoethoxy)bromobenzene,
p-(2-N,N-dipropargylaminoethoxy)bromobenzene,
p-(2-N,N-dicyclopropylaminoethoxy)bromobenzene,
p-(2-N,N-dibutinylaminoethoxy)bromobenzene,
p-(2-N,N-diethinylaminoethoxy)bromobenzene,
p-(2-N,N-dipropylaminoethoxy)bromobenzene,
p-(2-N,N-diethenylaminoethoxy)bromobenzene,
p-(2-N,N-dipropenylaminoethoxy)bromobenzene,
p-(2-N,N-dihexenylaminoethoxy)bromobenzene,
p-(2-N,N-dicinnamylaminoethoxy)bromobenzene,
p-(2-N,N-dibenzylaminoethoxy)bromobenzene,
p-(2-N,N-diphnethylaminoethoxy)bromobenzene,
p-(2-N,N-dihexylaminoethoxy)bromobenzene,
p-(2-N-cyclopropyl-N-phenylaminoethoxy)bromobenzene,
p-(2-N-benzyl-N-cyclopropylaminoethoxy)bromobenzene,
p-(2-N,N-diphenylaminoethoxy)bromobenzene,
p-(2-N-methyl-N-phenylaminoethoxy)bromobenzene,
p-(2-N,N-dicyclohexylaminoethoxy)bromobenzene,
p-(2-N,N-dicyclobutylaminoethoxy)bromobenzene,
p-(2-N,N-dicycloheptylaminoethoxy)bromobenzene,
p-(2-N,N-dimethylaminoethylthio)bromobenzene,
p-(2-N,N-diallylaminoethylthio)bromobenzene,
p-(2-N,N-dipropargylaminoethylthio)bromobenzene,
p-(2-N,N-dicyclopropylaminoethylthio)bromobenzene,
p-(2-N,N-diethinylaminoethylthio)bromobenzene,
p-(2-N,N-dibutinylaminoethylthio)bromobenzene,
p-(2-N,N-dipropylaminoethylthio)bromobenzeene,
p-(2-N,N-diphenylaminoethylthio)bromobenzene,
p-(2-N,N-dibenzylaminoethylthio)bromobenzene,
p-(3-N,N-diethylaminopropylthio)bromobenzene,
p-(4-N,N-diethylaminobutylthio)bromobenzene,
p-(2-N,N-diethylaminoethylthio)bromobenzene,
o-(2-N,N-diethylaminoethoxy)bromobenzene,
m-(2-N,N-diethylaminoethoxy)bromobenzene,
o-(2-N,N-diethylaminoethylthio)bromobenzene,
m-(2-N,N-diethylaminoethylthio)bromobenzene,
1-[2-(o-bromophenoxy)ethyl]pyrrolidine,
1-[2-(m-bromophenoxy)ethyl]pyrrolidine,
1-[2-(o-bromophenylthio)ethyl]pyrrolidine,
1-[2-(m-bromophenylthio)ethylpyrrolidine and
p-(2-N,N-diethylaminoethoxy)bromobenzene, there are obtained, 3,4-dihydro-7-methoxy-3-phenyl-4-hydroxy-4-{p-[2-(1-pyrrolidyl)-ethylthio]phenyl}-2H-1-benzothiopyran,
3,4-dihydro-7-methoxy-3-phenyl-4-hydroxy-4-{p-[2-(1-piperidino)-ethoxy]phenyl}-2H-1-benzothiopyran,
3,4-dihydro-7-methoxy-3-phenyl-4-hydroxy-4-{p-[2-(1-piperidino)-ethylthio]phenyl}-2H-1-benzothiopyran,
3,4-dihydro-7-methoxy-3-phenyl-4-hydroxy-4-{p-[2-(1-pyrrolidyl)-ethylthio]phenyl}-2H-1-benzothiopyran,
3,4-dihydro-7-methoxy-3-phenyl-4-hydroxy-4-{p-[1-pyrrolidyl]methoxy-phenyl}-2H-1-benzothiopyran,
3,4-dihydro-7-methoxy-3-phenyl-4-hydroxy-4-{p-[2-(1-2-methylpyrrolidyl)ethoxy]phenyl}-2H-1-benzothiopyran,
3,4-dihydro-7-methoxy-3-phenyl-4-hydroxy-4-{p-[2-(1-2,4-dimethylpyrrolidyl)ethoxy]phenyl}2H-1-benzothiopyran,
3,4-dihydro-7-methoxy-3-phenyl-4-hydroxy-4-{p-[2-(1-3-ethylpyrrolidyl)ethoxy]phenyl}-2H-1-benzothiopyran,
3,4-dihydro-7-methoxy-3-phenyl-4-hydroxy-4-{p-[2-(1-3-butylpyrrolidyl)ethoxy]phenyl}-2H-1-benzothiopyran,
3,4-dihydro-7-methoxy-3-phenyl-4-hydroxy-4-{p-[2-(1-2,4-dimethylpiperidino)ethoxy]phenyl}-2H-1-benzothiopyran,
3,4-dihydro-7-methoxy-3-phenyl-4-hydroxy-4-{p-[2-(1-3-methylpiperidino)ethoxy]phenyl}-2H-1-benzothiopyran,
3,4-dihydro-7-methoxy-3-phenyl-4-hydroxy-4-{p-[2-(1-4-propylpiperidino)ethoxy]phenyl}-2H-1-benzothiopyran,
3,4-dihydro-7-methoxy-3-phenyl-4-hydroxy-4-{p-[2-(1-4-methylpiperidino)ethoxy]phenyl}-2H-1-benzothiopyran,
3,4-dihydro-7-methoxy-3phenyl-4-hydroxy-4-{p-[2-(4-morpholino)ethoxy]phenyl}-2H-1-benzothiopyran,
3,4-dihydro-7-methoxy-3-phenyl-4-hydroxy-4-{p-[2-(4-2-methylmorpholino)ethoxy]phenyl}-2H-1-benzothiopyran,
3,4-dihydro-7-methoxy3phenyl4-hydroxy-4-{p-[2-(4,3-ethylmorpholino)ethoxy]phenyl}-2H-1-benzothiopyran,
3,4-dihydro-7-methoxy-3-phenyl-4-hydroxy-4-{p-[2-(4-2,6-dimethylmorpholino)ethoxy]phenyl}-2H-1-benzothiopyran,
3,4-dihydro-7-methoxy-3-phenyl-4-hydroxy-4-{p-[2-(1-4-methyl-1,2,5,6-tetrahydropyridino)ethoxy]phenyl}-2H-1-benzothiopyran,
3,4-dihydro-7-methoxy-3-phenyl-4-hydroxy-4-{p-[2-(1-4-methylpiperazino)ethoxy]phenyl}-2H-1-benzothiopyran, 3,4-dihydro-7-methoxy-3-phenyl-4-hydroxy-4-{p-[2-(1-2,-4-dimethylpiperazino)ethoxy]phenyl}-2H-1-benzothiopyran,
3,4-dihydro-7-methoxy-3-phenyl-4-hydroxy-4-{p-[2-(1-2,-4,6-trimethylpiperazino)ethoxy]phenyl}-2H-1-benzothiopyran,
3,4-dihydro-7-methoxy-3-phenyl-4-hydroxy-4-{p-[2-(1-hexamethyleneimino)ethoxy]phenyl}-2H-1-benzothiopyran,
3,4-dihydro-7-methoxy-3-phenyl-4-hydroxy-4-{p-[2-(N,N-dimethylamino)ethylthio]phenyl}-2H-1-benzothiopyran,
3,4-dihydro-7-methoxy-3-phenyl-4-hydroxy-4-{p-[2-(N,N-diallylamino)ethylthio]phenyl}-2H-1-benzothiopyran,
3,4-dihydro-7-methoxy-3-phenyl-4-hydroxy-4-{p-[2-(N,N-dipropargylamino)ethylthio]phenyl}-2H-1-benzothiopyran,
3,4-dihydro-7-methoxy-3-phenyl-4-hydroxy-4-{p-[2-(N,N-dicyclopropylamino)ethylthio]phenyl}-2H-1-benzothiopyran,
3,4-dihydro-7-methoxy-3-phenyl-4-hydroxy-4-{p-[2-(N,N-diethinylamino)ethylthio]phenyl}-2H-1-benzothiopyran,
3,4-dihydro-7-methoxy-3-phenyl-4-hydroxy-4-{p-[2-(N,N-dibutinylamino)ethylthio]phenyl}-2H-1-benzothiopyran,
3,4-dihydro-7-methoxy-3-phenyl-4-hydroxy-4-{p-[2-(N,N-dipropylamino)ethylthio]phenyl}-2H-1-benzothiopyran,
3,4-dihydro-7-methoxy-3-phenyl-4-hydroxy-4-{p-[2-(N,N-diphenylamino)ethylthio]phenyl}-2H-1-benzothiopyran,
3,4-dihydro-7-methoxy-3-phenyl-4-hydroxy-4-{p-[2-(N,N-dibenzylamino)ethylthio]phenyl}-2H-1-benzothiopyran,
3,4-dihydro-7-methoxy-3-phenyl-4-hydroxy-4-{p-[3-(N,N-diethylamino)propylthio[phenyl}-2H-1-benzothiopyran,
3,4-dihydro-7-methoxy-3-phenyl-4-hydroxy-4-{p-[4-(N,N-diethylamino)butylthio]phenyl}-2H-1-benzothiopyran,
3,4-dihydro-7-methoxy-3-phenyl-4-hydroxy-4-{p-[2-(N,N-diethylamino)ethylthio]phenyl}-2H-1-benzothiopyran,
3,4-dihydro-7-methoxy-3-phenyl-4-hydroxy-4-{o-[2-(N,N-diethylamino)ethoxy]phenyl}-2H-1-benzothiopyran,
3,4-dihydro-7-methoxy-3-phenyl-4-hydroxy-4-{m-[2-(N,N-diethylamino)ethoxy]phenyl}-2H-1-benzothiopyran,
3,4-dihydro-7-methoxy-3-phenyl-4-hydroxy-4-{o-[2-(N,N-diethylamino)ethylthio]phenyl}-2H-1-benzothiopyran,
3,4-dihydro-7-methoxy-3-phenyl-4-hydroxy-4-{p-[2-(1-2-methylhexamethyleneimino)ethoxy]phenyl}-2H-1-benzothiopyran,
3,4-dihydro-7-methoxy-3-phenyl-4-hydroxy-4-{p-[2-(1-2,-4-dimethylhexamethyleneimino)ethoxy]pheynl}-2H-1-benzothiopyran,
3,4-dihydro-7-methoxy-3-phenyl-4-hydroxy-4-{p-[2-(1-pyrrolidyl)isopropoxy]phenyl}-2H-1-benzothiopyran,
3,4-dihydro-7-methoxy-3-phenyl-4-hydroxy-4-{p-[3-(1-pyrrolidyl)propoxy]phenyl}-2H-1-benzothiopyran,
3,4-dihydro-7-methoxy-3-phenyl-4-hydroxy-4-{p-[4-(1-pyrrolidyl)butoxy]phenyl}-2H-1-benzothiopyran,
3,4-dihydro-7-methoxy-3-phenyl-4-hydroxy-4-{p-[2-(4-morpholino)ethylthio]phenyl}-2H-1-benzothiopyran,
3,4-dihydro-7-methoxy-3-phenyl-4-hydroxy-4-{p-[2-(1-4-methylpiperazino)ethylthio]phenyl}-2H-1-benzothiopyran,
3,4-dihydro-7-methoxy-3-phenyl-4-hydroxy-4-{p-[2-(1-hexamethyleneimino)ethylthio]phenyl}-2H-1-benzothiopyran,
3,4-dihydro-7-methoxy-3-phenyl-4-hydroxy-4-{p-[2-(N,N-dibutylamino)ethoxy]phenyl}-2H-1-benzothiopyran,
3,4-dihydro-7-methoxy-3-phenyl-4-hydroxy-4-{p-[2-(N,N-dimethylamino)ethoxy]phenyl}-2H-1-benzothiopyran,
3,4-dihydro-7-methoxy-3-phenyl-4-hydroxy-4-{p-[2-(N,N-diallylamino)ethoxy]phenyl}-2H-1-benzothiopyran,
3,4-dihydro-7-methoxy-3-phenyl-4-hydroxy-4-{p-[2-(N,N-dipropargylamino)ethoxy]phenyl}-2H-1-benzothiopyran,
3,4-dihydro-7-methoxy-3-phenyl-4-hydroxy-4-{p-[2-(N,N-dicyclopropylamino)ethoxy]phenyl}-2H-1-benzothiopyran,
3,4-dihydro-7-methoxy-3-phenyl-4-hydroxy-4-{p-[2-(N,N-dibutinylamino)ethoxy]phenyl}-2H-1-benzothiopyran,
3,4-dihydro-7-methoxy-3-phenyl-4-hydroxy-4-{p-[2-(N,N-diethinylamino)ethoxy]phenyl}-2H-1-benzothiopyran,
3,4-dihydro-7-methoxy-3-phenyl-4-hydroxy-4-{p-[2-(N,N-dipropylamino)ethoxy]phenyl}-2H-1-benzothiopyran,
3,4-dihydro-7-methoxy-3-phenyl-4-hydroxy-4-{p-[2-(N,N-diethenylamino)ethoxy]phenyl}-2H-1-benzothiopyran,
3,4-dihydro-7-methoxy-3-phenyl-4-hydroxy-4-{p-[2-(N,N-dipropenylamino)ethoxy]phenyl}-2H-1-benzothiopyran,
3,4-dihydro-7-methoxy-3-phenyl-4-hydroxy-4-{p-[2-(N,N-dihexenylamino)ethoxy]phenyl}-2H-1-benzothiopyran,
3,4-dihydro-7-methoxy-3-phenyl-4-hydroxy-4-{p-[2-(N,N-dicinnamylamino)ethoxy]phenyl}-2H-1-benzothiopyran,
3,4-dihydro-7-methoxy-3-phenyl-4-hydroxy-4-{p-[2-(N,N-dibenzylamino)ethoxy]phenyl}-2H-1-benzothiopyran,
3,4-dihydro-7-methoxy-3-phenyl-4-hydroxy-4-{p-[2-(N,N-diphenethylamino)ethoxy]phenyl}-2H-1-benzothiopyran,
3,4-dihydro-7-methoxy-3-phenyl-4-hydroxy-4-{p-[2-(N,N-dihexyl-amino)ethoxy]phenyl}-2H-1-benzothiopyran,
3,4-dihydro-7-methoxy-3-phenyl-4-hydroxy-4-{p-[2-(N-cyclopropyl-N-phenylamino)ethoxy]phenyl}-2H-1-benzothiopyran,
3,4-dihydro-7-methoxy-3-phenyl-4-hydroxy-4-{p-[2-(N-benzyl-N-cyclopropylamino)ethoxy]phenyl}-2H-1-benzothiopyran,
3,4-dihydro-7-methoxy-3-phenyl-4-hydroxy-4-{p-[2-(N,N-diphenylamino)ethoxy]phenyl}-2H-1-benzothiopyran,
3,4-dihydro-7-methoxy-3-phenyl-4-hydroxy-4-{p-[2-(N-methyl-N-phenylamino)ethoxy]phenyl}-2H-1-benzothiopyran,
3,4-dihydro-7-methoxy-3-phenyl-4-hydroxy-4-{p-[2-(N,N-dicyclohexylamino)ethoxy]phenyl}-2H-1-benzothiopyran,
3,4-dihydro-7-methoxy-3-phenyl-4-hydroxy-4-{p-[2-(N,N-dicyclobutylamino)ethoxy]phenyl}-2H-1-benzothiopyran,
3,4-dihydro-7-methoxy-3-phenyl-4-hydroxy-4-{p-[2-(N,N-dicycloheptylamino)ethoxy]phenyl}-2H-1-benzothiopyran,
3,4-dihydro-7-methoxy-3-phenyl-4-hydroxy-4-{m-[2-(N,N-diethylamino)ethylthio]phenyl}-2H-1-benzothiopyran,
3,4-dihydro-7-methoxy-3-phenyl-4-hydroxy-4-{o-[2-(1-pyrrolidyl)ethoxy]phenyl}-2H-1-benzothiopyran,
3,4-dihydro-7-methoxy-3-phenyl-4-hydroxy-4-{m-[2-(1-pyrrolidyl)ethoxy]phenyl}-2H-1-benzothiopyran,
3,4-dihydro-7-methoxy-3-phenyl-4-hydroxy-4-{o-[2-(1-pyrrolidyl)ethylthio]phenyl}-2H-1-benzothiopyran,
3,4-dihydro-7-methoxy-3-phenyl-4-hydroxy-4-{m-[2-(1-pyrrolidyl)ethylthio]phenyl}-2H-1-benzothiopyran and
3,4-dihydro-7-methoxy-3-phenyl-4-hydroxy-4-{p-[2-(N,N-diethylamino)ethoxy]phenyl}-2H-1-benzothiopyran, respectively.

Thus, it is apparent from the foregoing description that the objects of this invention have been attained. Novel compounds have been invented which have anti-fertility activity and inhibit pregnancy. In addition, a novel method of inhibiting pregnancy and controlling the animal population has been described.

While this invention has been described and exemplified in terms of its preferred embodiment, those skilled in the art will appreciate that modifications can be made without departing from the spirit and scope of this invention.

What is claimed is:
1. A compound selected from the group consisting of compounds of the formula

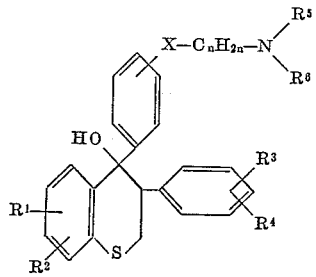

wherein
$n$ is a whole integer from 1 to 6 inclusive;
$R^1$, $R^2$, $R^3$ and $R^4$ each represent a member selected from the group consisting of hydrogen, chloro, bromo, iodo, fluoro, trifluoromethyl, (lower)alkyl, (lower)alkoxy, di(lower)alklamino, di(lower)alkylsulfamyl, (lower)alkanoyl, phenyl, phenoxy, benzyl and cycloalkyl radicals having from 5 to 7 carbon atoms inclusive;
$R^5$ and $R^6$ each represent a member selected from the group consisting of (lower)alkyl, (lower)alkenyl, (lower)alkynyl, phenyl, phenyl(lower)alkyl, cycloalkyl radicals having from 3 to 7 carbon atoms inclusive, and when taken together with —N<, constitute a heterocyclic ring selected from the group consisting of pyrrolidino, (lower)alkylpyrrolidino, di(lower)alkylpyrrolidino, piperidino, (lower)alkylpiperidino, di(lower)alkylpiperidino, morpholino, (lower)alkylmorpholino, di(lower)alkylmorpholino, tetrahydropyridino, (lower)alkyltetrahydropyridino, di(lower)alkyltetrahydropyridino, N'-(lower)alkylpiperazino, N'-(lower)alkyl(lower)alkylpiperazino, N' - (lower)alkyl - di(lower)alkylpiperazino, hexamethyleneimino, (lower)alkylhexamethyleneimino, di(lower)alkylhexamethyleneimino;
X is a member selected from the group consisting of oxygen and sulfur;
and the pharmaceutically acceptable nontoxic salts thereof.

2. A compound of claim 1 having the formula

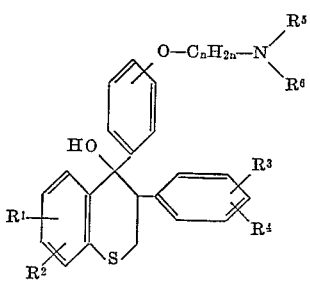

wherein
$n$ is a whole integer from 1 to 6 inclusive;
$R^1$, $R^2$, $R^3$ and $R^4$ each represent a member selected from the group consisting of hydrogen, chloro, beomo, iodo, fluoro, trifluoromethyl, (lower)alkyl, (lower)alkoxy, di(lower)alkylamino, di(lower)alkylsulfamyl, (lower)alkanoyl, phenyl, phenoxy, benzyl and cycloalkyl radicals having from 5 to 7 carbon atoms inclusive;
$R^5$ and $R^6$ each represent a member selected from the group consisting of (lower)alkyl, (lower)alkenyl, lower)alkynyl, phenyl phenyl(lower)alkyl, cycloalkyl radicals having from 3 to 7 carbon atoms inclusive, and when taken together with —N<, constitute a heterocyclic ring selected from the group consisting of pyrrolidino, (lower)alkylpyrrolidino, di(lower)alkylpyrrolidino, piperidino, (lower)alkylpiperidino, di(lower)alkylpiperidino, morpholino, (lower)alkylmorpholino, di(lower)alkylmorpholino, tetrahydropyridino, (lower)alkyltetrahydropyridino, di(lower)alkyltetrahydropyridino, N'-(lower)alkylpiperazino, N'-(lower)alkyl(lower)alkylpiperazino, N' - (lower)alkyl - di(lower)alkylpiperazino, hexamethyleneimino, (lower)alkylhexamethyleneimino, di(lower)alkylhexamethyleneimino;
and pharmaceutically acceptably nontoxic salts thereof.

3. A compound of claim 1 having the formula

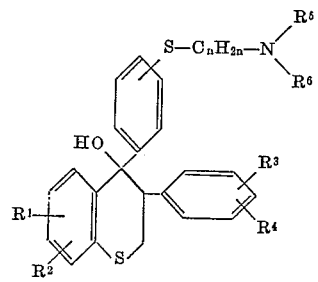

wherein
$n$ is a whole integer from 1 to 6 inclusive;
$R^1$, $R^2$, $R^3$ and $R^4$ each represent a member selected from the group consisting of hydrogen, chloro, bromo, iodo, fluoro, trifluoromethyl, (lower)alkyl, (lower)alkoxy, di(lower)alkylamino, di(lower)alkylsulfamyl, (lower)alkanoyl, phenyl, phenoxy, benzyl and cycloalkyl radicals having from 5 to 7 carbon atoms inclusive;
$R^5$ and $R^6$ each represent a member selected from the group consisting of (lower)alkyl, (lower)alkenyl, (lower)alkynyl, phenyl, phenyl(lower)alkyl, cycloalkyl radicals having from 3 to 7 carbon atoms inclusive, and when taken together with —N<, constitute a heterocyclic ring selected from the group consisting of pyrrolidino, (lower)alkylpyrrolidino, di(lower)alkylpyrrolidino, piperidino, (lower)alkylpiperidino, di(lower)alkylpiperidino, morpholino, (lower)alkylmorpholino, di(lower)alkylmorpholino, tetrahydropyridino, (lower)alkyltetrahydropyridino, di(lower)alkyltetrahydropyridino, N'-(lower)alkylpiperazino, N'-(lower)alkyl(lower)alkylpiperazino, N' - (lower)alkyl - di(lower)alkylpiperazino, hexamethyleneimino, (lower)alkylhexamethyleneimino, di(lower)alkylhexamethyleneimino;
and the pharmaceutically acceptable nontoxic salts thereof.

4. A compound of claim 1 having the formula

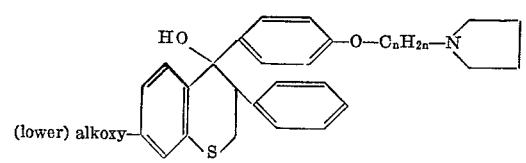

wherein $n$ is a whole integer from 1 to 6 inclusive.

5. A compound of claim 1 having the formula

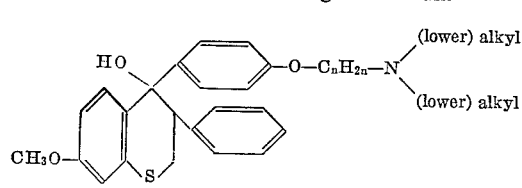

wherein $n$ is a whole integer from 1 to 6 inclusive.

6. A compound of claim 1 having the formula

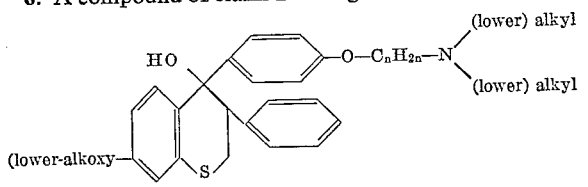

wherein *n* is a whole integer from 1 to 6 inclusive.

7. The compound of claim 1 having the formula

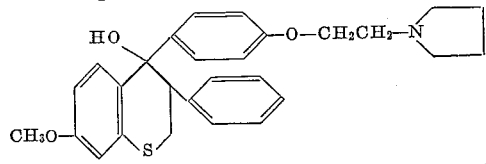

8. The pharmaceutically acceptable nontoxic salts of the compound of claim 7.

9. The compound of claim 1 having the formula

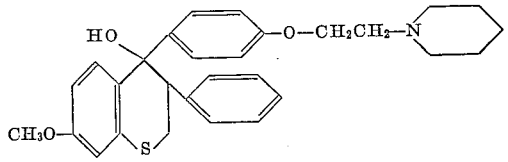

10. The compound of claim 1 having the formula

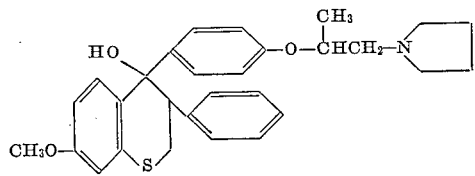

11. The compound of claim 1 having the formula

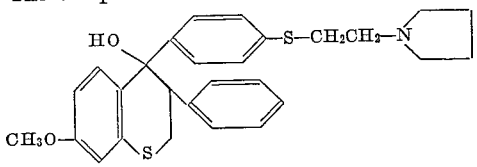

12. The compound of claim 1 having the formula

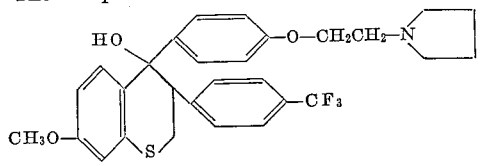

13. The compound of claim 1 having the formula

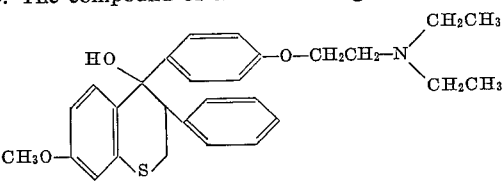

References Cited by the Examiner

UNITED STATES PATENTS 3,164,607  1/1965  Ledniser ———————— 260—294

FOREIGN PATENTS 656,720  6/1965  Belgium.

WALTER A. MODANCE, *Primary Examiner.*

AVROM D. SPEVACK, *Assistant Examiner.*